Nov. 4, 1930.  G. F. ECKART  1,780,745

DIFFERENTIAL

Filed Jan. 14, 1929

Inventor:
George F. Eckart,
By Banning & Banning
Attys.

Patented Nov. 4, 1930

1,780,745

UNITED STATES PATENT OFFICE

GEORGE F. ECKART, OF CHICAGO, ILLINOIS, ASSIGNOR TO GEORGE A. CHRITTON, TRUSTEE, OF CHICAGO, ILLINOIS

DIFFERENTIAL

Application filed January 14, 1929. Serial No. 332,504.

An object of this invention is to provide a differential which contains yieldable elements so that road shocks received through the rear axle will not be transmitted back to the propeller shaft, and likewise sudden strains in the propeller shaft will not be transmitted as shocks to the rear wheels.

Another object of this invention is to provide a differential of this kind which is simple and compact so that it can be readily enclosed within a differential housing.

These and other objects, as will hereinafter appear, are accomplished by this invention which is fully described in the following specification, and is shown in the accompanying drawing in which—

Figure 1:
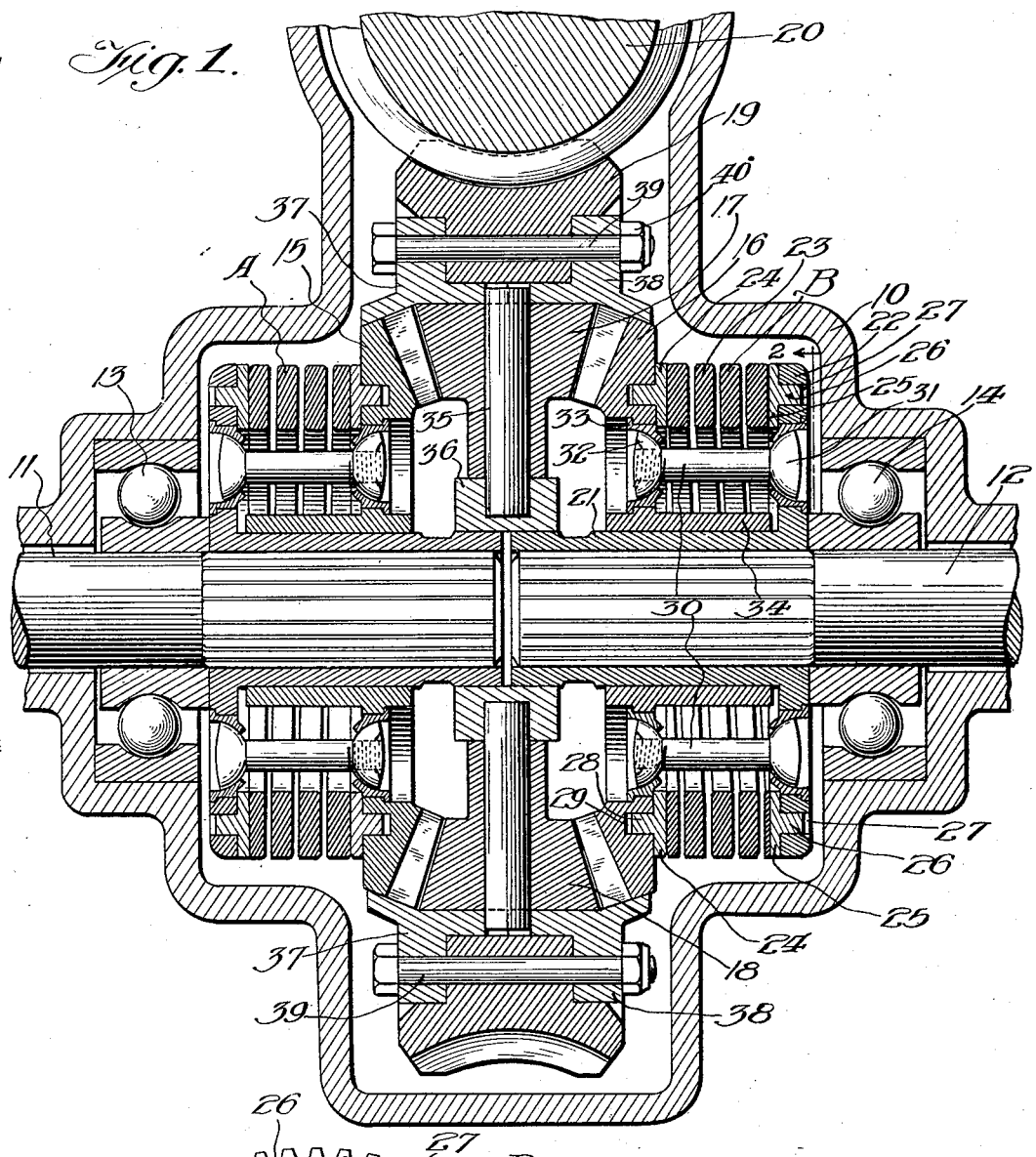
Figure 2:
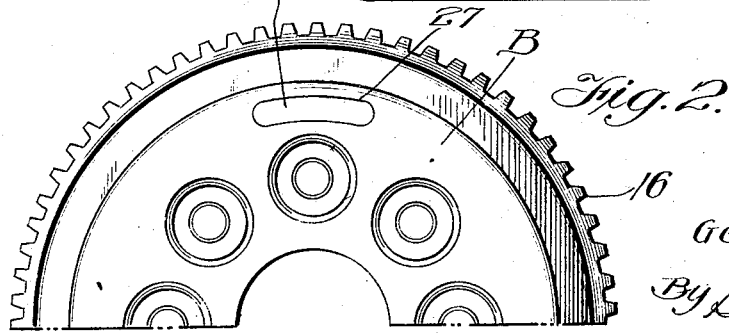

Figure 1 is a vertical longitudinal section through a differential embodying the invention; and Fig. 2 is a partial end elevation on the line 2 of Fig. 1.

The embodiment illustrated comprises a differential housing 10 forming part of a rear axle construction within which rear axle shafts 11 and 12 are enclosed, these shafts being provided with suitable ball bearings 13 and 14, the ones shown being of the well known combined radial and thrust type. These shafts, as will later be described in detail, are connected through flexible couplings A, B, with bevel gears 15 and 16 which in turn mesh with driving pinions 17 and 18 which are carried by the worm wheel 19, which meshes with a worm 20, the latter being driven through a propeller shaft in a well known manner.

The two sides of the differential are similar so that a description of one will suffice for both. The rear axle shaft 12 is splined to receive the correspondingly splined hub 21 of the flange 22. A helical spring 23 is firmly secured as by welding to annular rings 24 and 25. The annular ring 25 is provided with arcuate lugs 26 which fit into correspondingly shaped openings 27 in the flange 22. Similar lugs 28 on the annular ring 24 fit into similar openings 29 in the bevel gear 16.

Thus it will be seen that as the bevel gear 16 is driven, it acts through the spring 23 to drive the flange 22 which in turn drives the axle shaft 12. The bevel gear 16 and the flange 22 are connected by means of a plurality of radius rods 30 which are provided at one end with enlarged semi-spherical heads 31, and at the opposite end with similarly shaped nuts 32 which are screwed on the threaded ends of the radius rods 30, after which the nuts 32 are electrically welded or otherwise firmly secured in place. The semi-spherical heads 31 and nuts 32 are freely movable in semi-spherical cups 33, which are placed in openings in the gear 16 and in the flange 22.

The gear 16 is provided with a hub 34 which is journaled upon the hub 21 of the flange so that as the gear 16 turns with respect to the shaft, it remains concentric therewith. It will also be observed that as the gear 16 moves with respect to the flange 22, the radius rods 30 will move away from their normal position at right angles to both of these members so that the gear and flange will be drawn toward each other to some extent.

The bevel gears 17, of which there are usually four in number, set 90° apart, are journaled upon pins 35 which are firmly secured in a central ring 36, which is journaled upon the two opposing flange hubs 21. The outer end of the pins 35 are held in semi-cylindrical openings for the opposing annular clamping members 37 and 38. Bolts 39 pass through the members 37 and 38 and also through the worm wheel 19, and have nuts 40 with which they are firmly secured.

This arrangement permits the usual differential action to take place, and at the same time provides a yieldable connection between the drive and each of the rear wheels so that any road shock received by either will not be transmitted to the other rear wheel, nor to the propeller shaft of the automobile.

While I have described and shown by a single embodiment of my invention, it is to be understood that it is capable of many modifications. Changes, therefore, in the construction and arrangement may be made which do not depart from the spirit and scope of the invention as disclosed in the appended claims.

I claim:

1. In a differential, oppositely extending axle shafts, flanged members keyed thereon, opposed bevel gears rotatably mounted on said flanged members, helical spring means connecting each of said flanged members and its bevel gear, radius rods connecting said bevel gear and flanged member, and means for simultaneously driving said bevel gears.

2. In a differential, oppositely extending axle shafts, flanged members keyed thereon, opposed bevel gears rotatably mounted on said flanged members, a helical spring connecting each of said flanged members and its bevel gear, radius rods connecting said bevel gear and flanged member, means for simultaneously driving said bevel gears, and a housing enclosing said parts and carrying bearings for said shafts.

3. In a differential, oppositely extending axle shafts, flanged members keyed thereon, opposed bevel gears rotatably mounted on said flanged members, radius rods connecting each bevel gear and its flanged member, and spring means connecting each gear and its flanged member, said means tending to force said gear and member apart.

In testimony whereof I have hereunto set my hand this 11th day of January, 1929.

GEORGE F. ECKART.